United States Patent [19]

Bockerman

[11] Patent Number: 5,046,785
[45] Date of Patent: Sep. 10, 1991

[54] TRACTION WHEEL FOR CENTER PIVOTS AND THE LIKE

[76] Inventor: Bernard J. Bockerman, Route 1, Box 14, Prosser, Nebr. 68868-9407

[21] Appl. No.: 414,675

[22] Filed: Sep. 29, 1989

[51] Int. Cl.$^5$ .............................................. B60B 15/02
[52] U.S. Cl. ...................................... 301/52; 301/43; 301/44 B
[58] Field of Search .................... 301/41 R, 43, 44 R, 301/44 T, 44 B, 45, 46, 52, 53, 56, 59, 74, 104

[56] References Cited

U.S. PATENT DOCUMENTS

| | | | |
|---|---|---|---|
| 886,873 | 5/1908 | Schmidt | 301/53 X |
| 1,229,404 | 6/1917 | Bold | 301/52 |
| 1,229,712 | 6/1917 | Cassel | 301/52 |
| 1,748,405 | 2/1930 | Benjamin | 301/52 X |
| 1,829,823 | 11/1931 | Einfeldt | 301/52 X |
| 2,106,135 | 1/1938 | Henry | 301/52 |

FOREIGN PATENT DOCUMENTS 207274  1/1960  Austria .................................. 301/52

Primary Examiner—Russell D. Stormer
Attorney, Agent, or Firm—John A. Beehner

[57] ABSTRACT

A traction wheel has a pair of axially spaced apart annular rims presenting ground engagement surfaces which are inclined radially and axially inwardly toward one another to form the ground into a mound on which the wheel rides. A series of wedge-shaped lugs span the rims in circumferentially spaced apart relation. One of the inclined sides of several of the lugs extends radially inwardly to serve as a spoke for the rim. Each lug is generally V-shaped with an apex directed radially outwardly. An opening is formed through the apex both to increase traction and to dissipate any vacuum between the lug and ground.

15 Claims, 2 Drawing Sheets

TRACTION WHEEL FOR CENTER PIVOTS AND THE LIKE

BACKGROUND OF THE INVENTION

The present invention is directed generally to an improved traction wheel and more particularly to such a wheel particularly adapted for supporting and moving a center pivot irrigation tower on and across soft wet ground.

In a center pivot irrigation system, water from a centrally located well is directed through a long boom which is pivoted around the well by drive wheels on the spaced apart towers which support the boom. The towers may be 15 or 20 feet high, with as much as 60 feet between towers and many sections may be added together so that the single pivot can irrigate a quarter section of land. The towers are generally equipped with large rubber tires much like on a conventional farm tractor. When the tires rotate on muddy ground resulting from the irrigation water, or natural causes, the tires tend to push the mud to the sides and ahead of the tire so that the action of the tires is constantly that of climbing out of a hole. In muddy conditions, the tires tend to create a greater build up ahead of the tires, which may become so severe that the tire cannot climb out of it on its own power. That essentially shuts down the system until a tractor can be brought out to tow the tower ahead.

Accordingly, a principal object of the present invention is to provide an improved traction wheel.

Another object is to provide a traction wheel particularly suited for advancing an irrigation boom tower across muddy ground.

Another object is to provide an improved traction wheel which tends to ride on top of muddy ground and minimize the buildup of mud ahead of the rotating wheel.

Another object is to provide an improved traction wheel which is generally self cleaning as it crosses muddy ground.

Another object is to provide a traction wheel having circumferentially spaced lugs designed to be easily pulled from the mud as the wheel rolls forwardly.

Another object is to provide a traction wheel having transversely extended and circumferentially spaced apart traction lugs designed to dissipate any vacuum formed between the lug and the muddy ground.

Another object is to provide a traction wheel which is adjustable to vary the axial position of the wheel rim relative to the hub for universal mounting on non-uniform equipment of different manufacturers.

Another object of the invention is to provide a traction wheel which simple and rugged in construction, economical to manufacture and efficient in operation.

SUMMARY OF THE INVENTION

The traction wheel of the invention includes a pair of axially spaced apart annular rims presenting ground engagement surfaces which are inclined radially and axially inwardly toward one another to form the ground into a mound on which the wheel rests. A series of wedge shaped lugs are connected to and extended between the rims in circumferentially spaced apart relation to form openings through the wheel between the rims and the adjacent pairs of lugs. Each lug has inclined leading and trailing sides with respect to the direction of rotation of the wheel. One side of several of the lugs extends radially inwardly from the rims to serve as a spoke for the rims. The interior ends of those extended sides of the lugs are connected to a hub which is adapted to be mounted on a conventional axle assembly.

Each lug on the rims is generally V-shaped with an apex directed radially outwardly. An opening is formed through the apex of the lug both to increase traction and to dissipate any vacuum formed between the lug and muddy ground as the lug is pulled from the mud on the back side of a rolling wheel.

The extended lug sides which serve as spokes for the rim may be permanently welded to the hub or removably and adjustably connected to the hub for varying the axial position of the rims relative to the hub. Different manufacturers of center pivot towers have different specifications for the preferred axial position of the rims relative to the hub. By providing bushings on the interior ends of the spokes and by axially offsetting those interior ends relative to the rims, at least four adjustments can be made to the position of the rims relative to the hub. For example, the hub may be mounted to either end of the bushings and the wheel may have either of its opposite sides facing the hub.

DESCRIPTION OF THE PREFERRED EMBODIMENT

Figure 1:
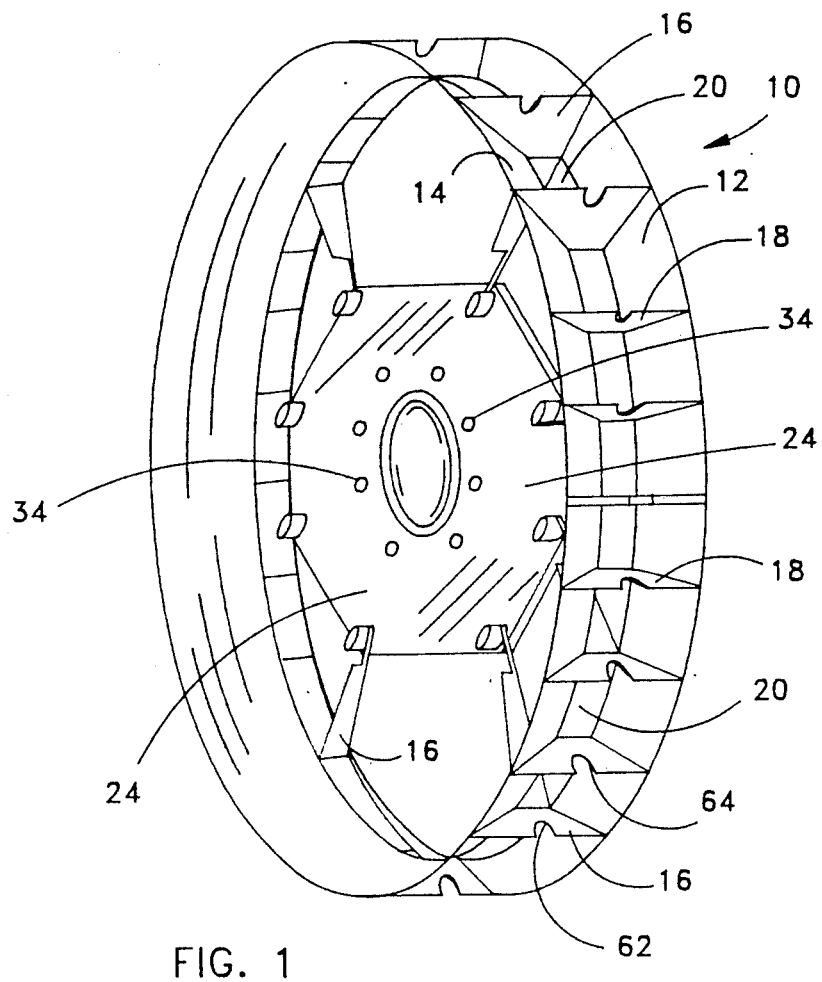
FIG. 1 is a perspective view of a traction wheel according to the invention.

The traction wheel 10 of the present invention is illustrated in FIG. 1 as including a pair of spaced apart annular rims 12 and 14 which are frustoconically shaped so as to be inclined radially and axially inwardly toward one another. The rims are connected together by a series of spoke forming wedge shaped lugs 16 and a series of simple wedge-shaped lugs 18. The lugs 16 and 18 cooperate with the rims to form openings through the wheel 10 between the rims and adjacent pairs of lugs. Such openings 20 afford a self-cleaning action for the wheels by allowing mud and dirt packed between the rims to pass through the openings in response to continued rotation of the wheel.

Each spoke forming lug 16 has an extended side 22 connected to a hub 24 which is adapted to be mounted on a convention axle assembly.

Figure 2:
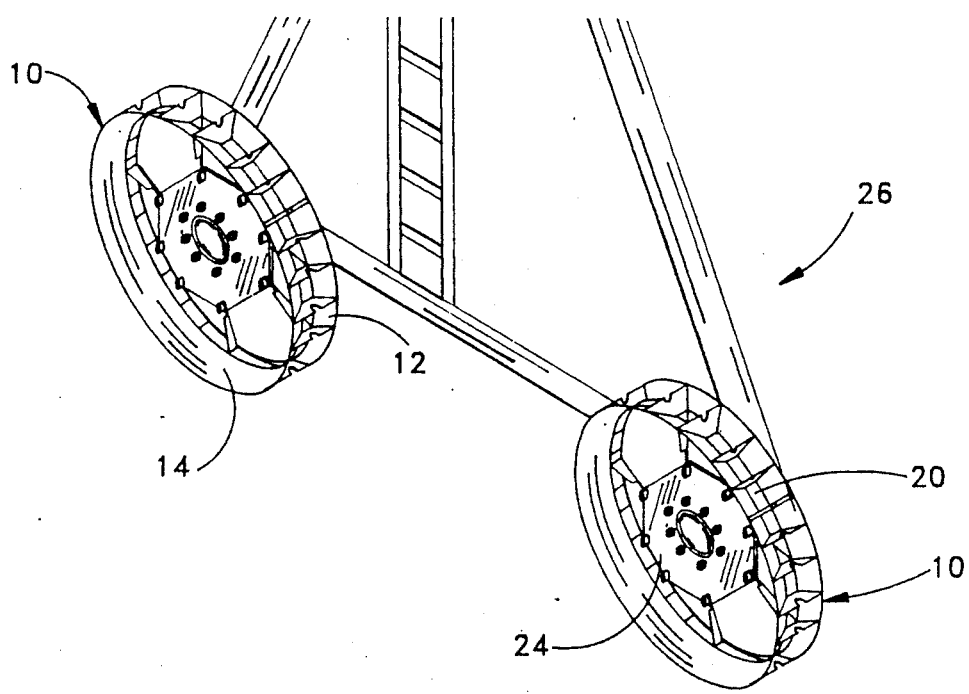
FIG. 2 is a partial perspective view of the lower portion of an irrigation tower having a pair of traction wheels of the invention mounted thereon.
Figure 3:
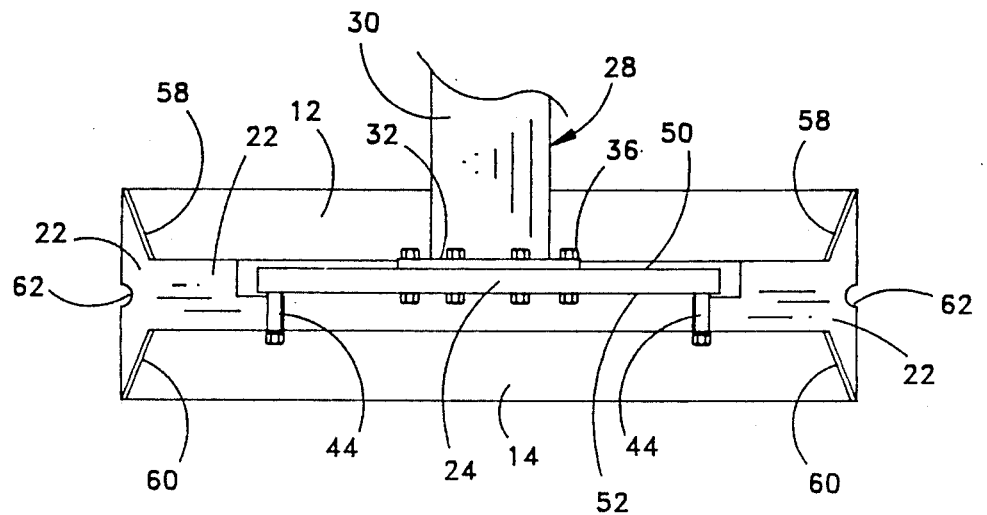
FIG. 3 is a partially sectional end elevational view of the traction wheel of the invention mounted on an axle assembly.

FIG. 2 shows an irrigation tower 26 having a pair of traction wheels 10 mounted thereon for supporting and moving the tower across a field. The connection of the tower 26 to each wheel 10 is by an axle assembly 28, as shown in FIG. 3. Axle assembly 28 includes a power driven axle 30 having a mounting plate 32 on the free end thereof. Mounting plate 32 has a series of circumferentially spaced apart holes alignable with registered holes 34 in the hub 24 for securement of the wheel to the mounting plate 32 in the conventional fashion by bolt assemblies 36.

Figure 4:
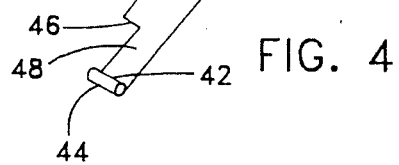
FIG. 4 is an enlarged perspective view of a spoke forming lug of the wheel.

FIG. 4 illustrates the spoke forming lug 16 which is generally V-shaped with an apex 38 directed radially outwardly. Lug 16 has a short side 40 adapted to terminate at the interior edge of the rims whereas the extended side 22 extends radially interiorly from the rims to serve as a spoke for the wheel. The interior end 42 of the extended side may be welded or otherwise rigidly secured to the hub for a permanent non-universal connection. Alternatively, the interior end 42 may be removably and adjustably connected to the hub for a generally universal connection adapted to accommodate mounting of the wheel on irrigation towers of different manufacturers.

One type of universal connection is illustrated in FIG. 3 and 4 wherein the interior end 42 of the extended side 22 of lug 16 has a bushing 44 formed thereon. Furthermore, the extended side 22 is notched as at 46 such that the lower most end 48 of the extended side 22 comprises an extension of only a portion of the width of side 22 at a position radially outwardly of the notch 46. Accordingly, the bushing 44 is axially offset relative to the center of lug 16.

Referring to FIG. 3, this presents four alternate mounting positions of the wheel 10 relative to the axle mounting plate 32. First, the hub 24 is adapted for connection to the bushings 44 at either of opposite ends of the bushings thereby to vary the position of the rims axially relative to the hub. Furthermore, the hub includes axially oppositely facing first and second sides 50 and 52 and the hub 24 is adapted for connection to the axle mounting plate 32 with either of the opposite first and second sides 50 and 52 facing the axle mounting plate, thereby to further vary the position of the rims 12 and 14 axially relative to the hub 24.

Figure 5:
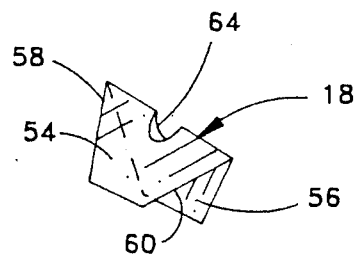
FIG. 5 is an enlarged perspective view of a simple lug of the wheel.
Figure 6:
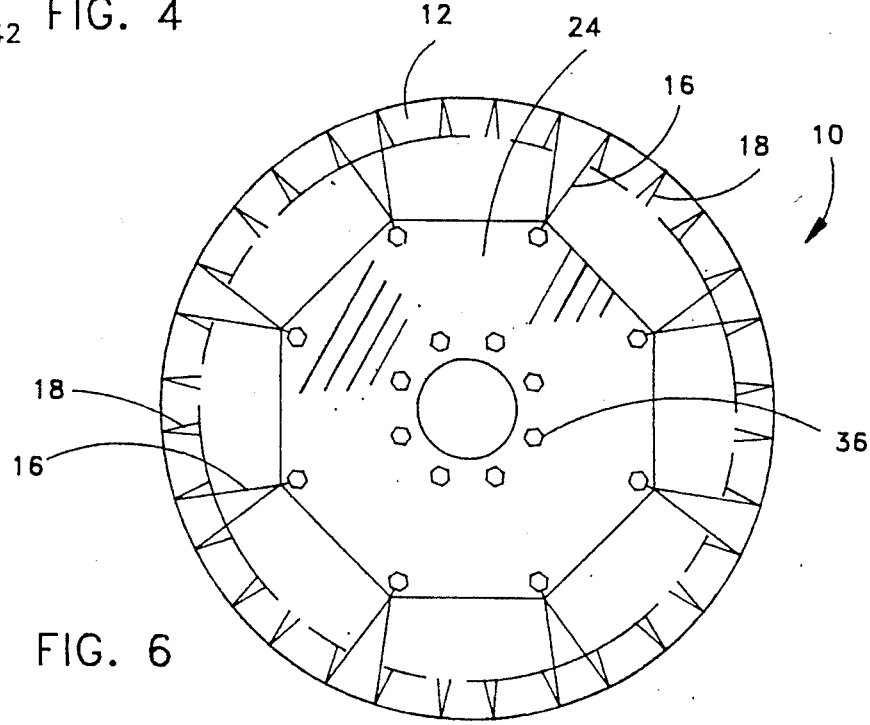
FIG. 6 is a partially sectional side elevational view of the traction wheel of the invention.

As shown in FIG. 6, one or more simple lugs 18 may be interposed between adjacent pairs of spoke forming lugs 16. A simple lug is illustrated in FIG. 5 wherein the leading and trailing sides 54 and 56 are formed as substantially the mirror image of one another. Each side has outer edges 58 and 60 which taper radially and axially inwardly in matching relation to the spaced apart rims 12.

Referring to FIGS. 4 and 5, it is seen that both these spoke forming lugs 16 and simple lugs 18 have respective openings 62 and 64 through the apex thereof, preferably at a transversely centered position thereon. The openings 62 and 64 both provide increased traction for the lugs and also serve to dissipate any vacuum formed between the lug and soft ground as the lug is pulled out the of the ground in response to rotation of the wheel 10.

The number and arrangement of lugs on the wheel may be varied according to any selected pattern FIG. 6 illustrates an arrangement wherein adjacent pairs of spoke forming lugs 16 are oppositely directed and connected to common bushings 44. Each pair of spoke forming lugs has a pair of simple lugs interposed in between them. The result is a 32 lug wheel. Other contemplated arrangements include providing a simple lug 18 between each adjacent pair of spoke forming lugs 16, or providing a 24 lug wheel wherein a simple lug 18 is provided between alternate pairs of spoke forming lugs with 16 spoke forming lugs being provided The extended sides of the spoke forming lugs are preferably inclined relative to a true radius of rims 12 and 11 through either of opposite ends of the spoke forming lugs 16 whereby torque is built into the wheel.

The wheel as thus described is non-directional and the V-shape of the wedges further prevents mud from being picked up in response to rotation of the wheel. Should the wheel of the invention become stuck, a cable may be run under the wheel and staked to the ground so that the lug openings 62 will engage the cable to enable the wheels to crawl up the cable toward the stake and thereby free the tower and implement by the use of its own power.

Whereas material from which the wheel is formed is not critical to the invention, a preferred embodiment has the rim formed of quarter inch steel plate and spokes or lugs formed of 3/16th inch steel plate. A 43" diameter is preferred for the wheels so that they could be operated in tandem with conventional rubber tire carrying wheels.

Whereas the invention as been shown and described in connection with a preferred embodiment thereof, it is apparent that many additions, modifications and substitutions may be made which are within the intended broad scope of the appended claims.

For example, whereas the lugs are shown with the apex thereof disposed at the outer circumferential edge of the rims, it may be preferred to extend the lugs radially outwardly of the rims so that the wheel has three point contact on flat hard ground or a smooth concrete spill-way for better traction for climbing.

Thus there has been shown and described an improved traction wheel which accomplishes at least all of the stated objects.

I claim:

1. A traction wheel adapted to be mounted on an axle assembly, said traction wheel comprising,
    a pair of axially spaced apart annular rims, said rims presenting ground engagement surfaces which are inclined radially and axially inwardly toward one another,
    a plurality of generally edge shaped lugs connected to and extending between said pair of rims in circumferentially spaced apart relation, thereby to form openings through said wheel between said rims and adjacent pairs of lugs,
    each lug including leading and trailing sides with respect to the direction of rotation of said wheel,
    one side of a first plurality of is lugs extending generally radially inwardly of said rims to serve as a spoke thereof,
    hub means connected to said one sides of said first plurality of lugs, said hub means including means for mounting said wheel on an axle assembly,
    each lug being generally V-shaped with an apex directed radially outwardly, and
    at least one lug having an opening through the apex thereof.

2. The traction wheel of claim 1, wherein each lug includes outer edges which taper radially and axially inwardly in matching relation to said spaced apart rims.

3. The traction wheel of claim 1, wherein said one side of said first plurality of lugs is inclined relative to a trude radius of said rims through either of opposite ends of said one side.

4. The traction wheel of claim 1 wherein said opening is generally axially centered on said lug.

5. The traction wheel of claim 1 wherein all of said lugs have an opening through the apex thereof.

6. The traction wheel of claim 1 wherein said one side has a radially inner end and further comprising a bushing connected to said inner end and directed with its axis generally parallel to the axis of said wheel, hub means including a plurality of mounted holes alignable with said bushings for securement thereto by respective fastening means extended through said aligned mounting holes and bushings.

7. The traction wheel of claim 76 wherein said bushing is axially offset relative to the center of said done side.

8. The traction wheel of claim 7 wherein said hub means is adapted for connection to said bushings at either of opposite ends of said business s thereby to vary the position said rims axially relative to said hub means.

9. The traction wheel of claim 8 wherein said hub means includes axially oppositely facing first and second sides, said hub means being adapted for connection to said axle assembly with either of said opposite first and second sides facing said axle assembly, thereby to further vary the position of said rims axially relative to said hub means.

10. A traction wheel adapted to be mounted on an axle assembly, said traction wheel comprising,
  a pair of axially spaced apart annular rims, said rims presenting ground engagement surfaces which are inclined radially and axially inwardly toward one another,
  a plurality of generally wedge shaped lugs connected to and extending between said pair of rims incircumfernetially spaced apart relation, thereby to form openings through said wheel between said rims and adjacent pairs of lugs,
  each lug including leading and trailing sides with respect to the direction of rotation of said wheel,
  one side of a first plurality of said lugs extending generally radially inwardly of said rims to serve as a spoke therefor,
  hub means connected to said one sides of said first plurality of lugs, said hub means including means or mounting said wheel on an axle asssembly, and
  said one side of said first plurality of lugs being notched such that the lower most end of said one side comprises an extension of only a portion of the width of said one side at a position radially outwardly of said notch.

11. A traction wheel adapted to be mounted on an axle assembly, said traction wheel comprising,
  a pair of axially spaced apart annular rims, said rims presenting ground engagement surfaces which are inclined radially and axially inwardly toward one another,
  a plurality of generally wedge shaped lugs connected to and extending between said pair of rims in circumferentially spaced apart relation, thereby to form openings through said wheel between said rims and adjacent pairs of lugs,
  each lug including leading and trailing sides with respect to the direction of rotation said wheel,
  one side of a first plurality of said lugs extending generally radially inwardly of said rims to serve as a spoke thereof,
  hub means connected to said one sides of said first plurality of lugs, said hub means including means for mounting said wheel on an axle asssembly, and
  the leading and trailing sides of a second plurality of said lugs being formed as substantially the mirror image of one another.

12. The traction wheel of claim 11, wherein at least one lug of said second plurality of lugs is interposed between adjacent lugs of said first plurality of lugs.

13. In combination,
  an irrigation tower including a pair of power driven axle assemblies, each axle assembly having a mounting plate on a free end thereof, and each mounting plate having a series of circumferentially spaced apart fastener means adapted for mounting a traction wheel on said mounting plate,
  a pair of traction wheels, each traction wheel comprising,
    a pair of axially spaced apart annular rims, said rims presenting ground engagement surfaces which are inclined radially and axially inwardly toward one another,
    a plurality of generally wedge shaped lugs connected to and extending between said pair of rims in circumferentially spa ed apart relation, thereby to form openings through said wheel between said rims and adjacent pairs of lugs,
    each lug including leading and trailing sides with respect to the direction of rotation of said wheel,
    one side of a first plurality of said lugs extending generally radially inwardly of said rims to serve as a spoke therefor, and
    hub means connected to said one sides of said first plurality of lugs, said hub means including a series of circumferentially spaced apart holes registered with said fastener means such that said fastener means are operative to mount said hub on said mounting plate,
    each lug being generally V-shaped with an apex directed radially outwardly and at least one lug having an opening through the apex thereof.

14. In combination,
  an irrigation tower including aport of power driven axle assemblies, each axle assembly having a mounting plate on a free end thereof, and each mounting plate having a series of circumferentially spaced apart fastener means adapted for mounting a traction n wheel on said mounting plate,
  a pair of traction wheels, each traction wheel comprising,
    a pair of axially spaced apart annular rims, said rims presenting ground engagement surfaces which are inclined radially and axially inwardly toward one another,
    a plurality of generally wedge shaped lugs connected to and extending between said pair of rims in circumferentially spaced apart relation, thereby to form openings through said wheel between said rims and adjacent pairs of lugs,
    each lug including leading and trailing sides with respect to the direction of rotational of said wheel,
    one side of a first plurality of said lugs extending generally radially inwardly of said rims to serve as a spoke therefor, and
    hub mean connected to said one sides of said first plurality of lugs, said hub means including a series of circumferentially spaced apart holes registered with said fastener means such that said fastener means are operative to mount said hub on said mounting plate.
    said one side of said first plurality of lugs being notched such that the lower most end of said one side comprises an extension of only a portion of the width of said one side at a position radially outwardly of said notch.

15. In combination, an irrigation tower including a pair of power driven axle assemblies, each axle assembly having a mounting a traction wheel on said mounting plate, a pair of traction wheels, each traction wheel comprising, a pair of axially spaced apart annular rims, said rims presenting ground engagement surfaces which are inclined radially and axially inwardly toward one another, a plurality of generally wedge shaped lugs connected to and extending between said pair of rims in circumferentially spaced apart relation, thereby to form openings through said wheel between said rims and adjacent pairs of lugs, each lug including leading and trailing sides with respect to the direction of rotation of said wheel, one side of a first plurality of said lugs extending generally radially inwardly of said rims to serve as a spoke therefor, and hub means connected to said one sides first plurality of lugs, said hub means including a series of circumferentially spaced apart holes registered with said fastener means hub that said fastener means are operative to mount to said hub on said mounting plate, the leading and trailing sides of a second plurality of said lugs being formed as substantially the mirror image of one another.

* * * * *